US008085965B2

(12) United States Patent
Akino

(10) Patent No.: US 8,085,965 B2
(45) Date of Patent: Dec. 27, 2011

(54) CONDENSER MICROPHONE

(75) Inventor: Hiroshi Akino, Machida (JP)

(73) Assignee: Kabushiki Kaisha Audio-Technica, Machida-shi (JP)

( * ) Notice: Subject to any disclaimer, the term of this patent is extended or adjusted under 35 U.S.C. 154(b) by 1295 days.

(21) Appl. No.: 11/733,393

(22) Filed: Apr. 10, 2007

(65) Prior Publication Data

US 2007/0242841 A1 Oct. 18, 2007

(30) Foreign Application Priority Data

Apr. 12, 2006 (JP) ................................ 2006-109655

(51) Int. Cl.
*H04R 21/02* (2006.01)
*H04R 25/00* (2006.01)
*H04R 11/04* (2006.01)
*H04B 15/00* (2006.01)

(52) U.S. Cl. ........ 381/368; 381/174; 381/355; 381/362; 381/94.1

(58) Field of Classification Search .................. 381/174, 381/355, 360, 362, 368, 94.1
See application file for complete search history.

(56) References Cited

U.S. PATENT DOCUMENTS 3,989,905 A * 11/1976 Anderson et al. ............. 381/360
4,210,893 A * 7/1980 Hara ............................ 337/407
4,788,517 A * 11/1988 Meister ......................... 335/205
4,819,141 A * 4/1989 Maglica et al. ............... 362/207
6,463,159 B1 * 10/2002 Ming-Cheng ................. 381/355
6,904,155 B2 * 6/2005 Yonehara et al. ............ 381/174
2006/0093177 A1 * 5/2006 Kobayashi .................... 381/355

FOREIGN PATENT DOCUMENTS

JP 58-130362 8/1983
JP 2003-178735 6/2003

* cited by examiner

*Primary Examiner* — Fan Tsang
*Assistant Examiner* — Eugene Zhao
(74) *Attorney, Agent, or Firm* — Oblon, Spivak, McClelland, Maier & Neustadt, L.L.P.

(57) ABSTRACT

A condenser microphone provided with a battery compartment having a coil spring electrode is adapted to: extend a return stroke of the coil spring electrode; prevent high frequency current from penetrating into the microphone from the coil spring electrode to suppress the occurrence of noise; and prevent the coil spring electrode from generating mechanical noise. The condenser microphone includes: a body case into which a condenser microphone unit is incorporated; a battery compartment provided in the body case; a coil spring electrode that is provided at an end of the battery compartment, and pushed and compressed by an electrode of a battery by the battery being inserted therein; and a conductive cushion that is disposed within the coil spring electrode, and can contact with the coil spring electrode while being compressed together with the coil spring electrode at least when the coil spring electrode is compressed.

8 Claims, 3 Drawing Sheets

(RELATED ART)

CONDENSER MICROPHONE

BACKGROUND OF THE INVENTION

1. Field of the Invention

The present invention relates to a condenser microphone, and in particular relates to the structure of a power supply battery housing part and more specifically to the structure of an electrode.

2. Related Background of the Invention

Since the impedance of a microphone unit is extremely high, a condenser microphone incorporates therein an impedance converter comprised of an FET (field effect transistor) as a main body, thereby reducing the output impedance. A power supply is required for driving the impedance converter. The power supply includes a phantom power supply, which is an external power supply, and a built-in power supply comprised of a battery, which is housed in a battery compartment within the microphone.

The sound signal converted by the condenser microphone unit is impedance-converted by the impedance converter and then passes through a power module part that includes a low cut circuit, an output circuit, and the like, to be output as a microphone output. This microphone output is input into an external circuit via an output cable comprised of a balanced shielded cable. The output cable is constructed so as to be removably connected to the microphone body by a standardized three-pin type microphone connector, e.g., a connector defined by EIAJ RC-5236 "Latch-Lock Type Round Connector for Acoustic Equipment". The three-pin type microphone connector is commonly used with a first pin as ground, a second pin as the hot side of a signal and a third pin as the cold side of a signal. The connector of the microphone body is a male connector, the cable side connector is a female connector, and the both connectors are engaged so that the microphone body is electrically connected to the output cable. To the first pin of the cable side connector a connection end which is an extended part of a shield outer jacket of the microphone cable is connected, and two core wires of the microphone cable are connected to the second pin and third pin, respectively.

If the microphone body or the output cable is irradiated with strong electromagnetic waves and then the electromagnetic waves directly penetrate into the microphone body, or travel through the output cable and penetrate into the microphone body via the connector, these are demodulated by the impedance converter or other circuitry to be output from the microphone as audio frequency noise. In particular, as in recent years, as mobile phones have spread widely, a mobile phone is often used in the vicinity of a microphone and electric waves of the mobile phone more often penetrate into the microphone, thus presenting a serious problem of noise generation caused by high frequencies used in the mobile phone.

The condenser microphone includes a battery compartment for a built-in power supply as described above, and the existence of this battery compartment causes penetration of high frequency electromagnetic waves from the outside. Hereinafter, the reason will be described with reference to an example of a conventional condenser microphone shown in FIG. 3A and FIG. 3B.

In FIG. 3A and FIG. 3B, a body case 10 of a microphone is an approximately cylindrical member, and a part of the peripheral wall of an intermediate portion in the axial direction of the cylinder is removed to form a partially cylindrical shape. In the body case 10, end plates 14 and 16 serving also as an electrode receptacle are fixed to both ends of the portion formed into the partially cylindrical shape, respectively, and an interior space of the partially cylindrical shape of the body case 10 partitioned by the end plates 14 and 16 serves as a battery compartment 12. The battery compartment 12 is capable of housing a dry cell used for the built-in power supply, e.g., one AA dry cell 20. To the end plate 16, an electrode plate 17 formed so as to receive the positive electrode of the dry cell 20 is mounted, and to the other end plate 14, there is mounted a coil spring electrode 18 for pressing the dry cell 20 toward the electrode plate 17, the coil spring electrode 18 being in contact with the negative electrode of the dry cell 20. The outer diameter of the coil spring electrode 18 decreases sequentially from the base toward the tip, the coil spring electrode 18 is allowed to sink into one plane when being pushed by the negative electrode of the dry cell 20, and thereby a large return stroke can be obtained.

The tip (at the left end in FIG. 3A and FIG. 3B) side of the body case 10 partitioned by the end plate 16 is a microphone unit incorporating part 30, and into this microphone unit incorporating part 30 a non-illustrated condenser microphone unit is to be incorporated. The inner periphery of one end of a connector sleeve 28 is fitted around the outer periphery of the back end side of the body case 10, resulting in the connector sleeve 28 being added to the body case 10. At the back end side of the body case 10, a microphone side output connector 40 comprised of a male connector is incorporated into the connector sleeve 28. The output connector 40 includes, behind the end plate 14, a connector base 24 fitted into and fixed to the connector sleeve 28, and connector pins 26 passing through this connector base 24 and being fixed thereto. The output connector 40 is the above-described standardized three-pin type connector, so there are three connector pins 26, however, two pins are illustrated in FIG. 3A and FIG. 3B and the rest pin is hidden behind the two pins. Each connector pin 26 extends in parallel with the axis of the body case 10 and connector sleeve 28. A female-type cable side connector provided at one end of a non-illustrated output cable is coupled to the output connector 40. The cable side connector is fitted into the output connector 40 along the inner peripheral face of the connector sleeve 28, each connector pin 26 of the output connector 40 fits into each receptacle hole of the cable side connector, and thereby the microphone is electrically connected to an external circuit via the output cable.

A cylindrical cover 22 is fitted around the outer periphery of the connector sleeve 28. The cover 22 is movable in the axis direction of the body case 10 while sliding along the outer peripheral face of the connector sleeve 28, and as shown in FIG. 3A, the battery compartment 12 is opened by sliding the cover 22 to the back end side of the body case 10, and as shown in FIG. 3B, by sliding the cover 22 toward the front end side of the body case 10, most of the body case 10 is covered so as to close the battery compartment 12. As shown in FIG. 3A, while the battery compartment 12 is opened, the dry cell 20 can be inserted and removed. As shown in FIG. 3B, the cover 22 covering most of the body case 10 functions also as a grip of the microphone.

As apparent from the above description, the output connector 40 of the microphone exists close to the battery compartment 12, and to this output connector 40 the output cable is connected. Since the battery compartment 12 is constructed so as to be opened and closed with the cover 22 in order to insert and remove a battery and the output connector 40 is constructed so as to insert and remove the cable side connector, there is a gap required for opening and closing or inserting and removing in the battery compartment 12 as well as in the output connector 40. The existence of this gap causes the penetration of high frequency electromagnetic waves into the microphone as described above.

Moreover, the dry cell 20 which is the built-in power supply is grouped into size D, size C, and size AA, however, for example, even with the same AA type, the size thereof differs depending on the manufacturer or the kind of cells. Accordingly, the battery compartment 12 is designed assuming the maximum size among these, and electrical connection needs to be maintained surely even if a dry cell of the smallest size is inserted. Then, the electrode which the negative electrode of the dry cell 20 contacts with is designed so as to obtain a large return stroke as the coil spring electrode 18. In addition to this, the output connector 40 is disposed adjacent to the battery compartment 12, and there is a gap around this output connector 40 as described above, thus providing a portion with poor shielding against the electromagnetic waves. For this reason, the coil spring electrode 18 positioned in the vicinity of the output connector 40 acts as a coil, and the electromagnetic waves that penetrated from the periphery of the output connector 40 are captured by the coil spring electrode 18 and are detected by circuitry in the microphone and output as a noise.

Furthermore, there is also a drawback in case of using a microphone by hand, where a shock is often applied to the microphone due to various causes, such as hitting the microphone against something or dropping it, and the coil spring electrode 18 vibrates every time, thereby causing mechanical noise.

Various kinds of improvements for preventing the mechanical noise of the coil spring electrode have been proposed. For example, stuffing the interior of the coil spring electrode with sponge for restraining the vibration is carried out.

Moreover, a structure is proposed in which a free end of a coil spring electrode is folded back toward the base end side, and while a battery is not inserted in a battery compartment, the tip of the fold-part is in contact with a substrate of the battery compartment by a biasing force of the coil spring electrode, thereby preventing a resonance vibration of the coil spring electrode (e.g., see Patent Document 1).

Furthermore, a structure is proposed in which a bulging part is provided at one end side of a battery compartment so that the coil spring electrode can be forcibly fixed without generating a gap between a holding part that is provided at the one end side of the battery compartment in order to hold the coil spring electrode, and the base of the coil spring electrode held by this holding part (e.g., see Patent Document 2).

[Patent Document 1] Japanese Patent Application Laid-Open No. 2003-178735

[Patent Document 2] Japanese Patent Application Laid-Open No. 58-130362

SUMMARY OF THE INVENTION

[Problems to be Solved by the Invention]

Although the conventional example of stuffing the interior of the coil spring electrode with sponge as well as the conventional examples described in Patent Documents 1 and 2 may be expected to produce a certain level of advantage as a means for preventing the mechanical noise of the coil spring electrode, they may not be expected to provide an advantage that the high frequency electromagnetic waves attempting to penetrate into the microphone from the outside is shielded to thereby prevent the occurrence of noise. Moreover, according to the conventional example of stuffing the interior of the coil spring electrode with sponge, there is a drawback in that the sponge restricts the sink of the coil spring electrode and thus actually decreases the return stroke of the coil spring electrode or the coil spring electrode will not function as a coil spring.

The present invention has been made in order to dissolve the problems in the above-described conventional art and is intended to prevent, in a condenser microphone provided with a battery compartment having a coil spring electrode, the coil spring electrode from having impedance with respect to high frequency current, thereby preventing the high frequency current from penetrating into the microphone from the coil spring electrode and thereby suppressing occurrence of noise.

The present invention is also intended to provide, in the condenser microphone provided with the battery compartment having the coil spring electrode, a structure capable of increasing the return stroke of the coil spring electrode so as to address even if the dimension of batteries to be inserted varies, and also to prevent the coil spring electrode from generating mechanical noise even if a mechanical impulse force is applied thereto.

[Means for Solving the Problems]

A condenser microphone according to the present invention includes: a body case into which a condenser microphone unit is incorporated; a battery compartment provided in the body case; a coil spring electrode that is pushed and compressed by an electrode of a battery due to the battery being inserted therein, the coil spring electrode being provided at an end of the battery compartment; and a conductive cushion that can contact with the coil spring electrode and is compressed together with the coil spring electrode at least when the coil spring electrode is compressed, the conductive cushion being disposed within the coil spring electrode.

[Advantages of the Invention]

When a battery is inserted into the battery compartment, the coil spring electrode is pushed and compressed by an electrode of the battery, and the conductive cushion is also compressed by the coil spring electrode. Since the coil spring electrode and the conductive cushion are electrically integrated due to the coil spring electrode being in contact with the conductive cushion, the coil spring electrode will not act as a coil with respect to high frequency current and thus the high frequency current is prevented from penetrating into the microphone through the coil spring electrode and the occurrence of noise caused by the high frequency current is prevented.

Since the conductive cushion can expand and contract together with the coil spring electrode, the return stroke of the coil spring electrode will not be restricted by the conductive cushion. By contacting the conductive cushion with the coil spring electrode, the vibration of the coil spring electrode can be suppressed and thus the occurrence of mechanical noise due to the coil spring electrode can be suppressed.

DESCRIPTION OF THE PREFERRD EMBODIMENTS

Figure 1A:
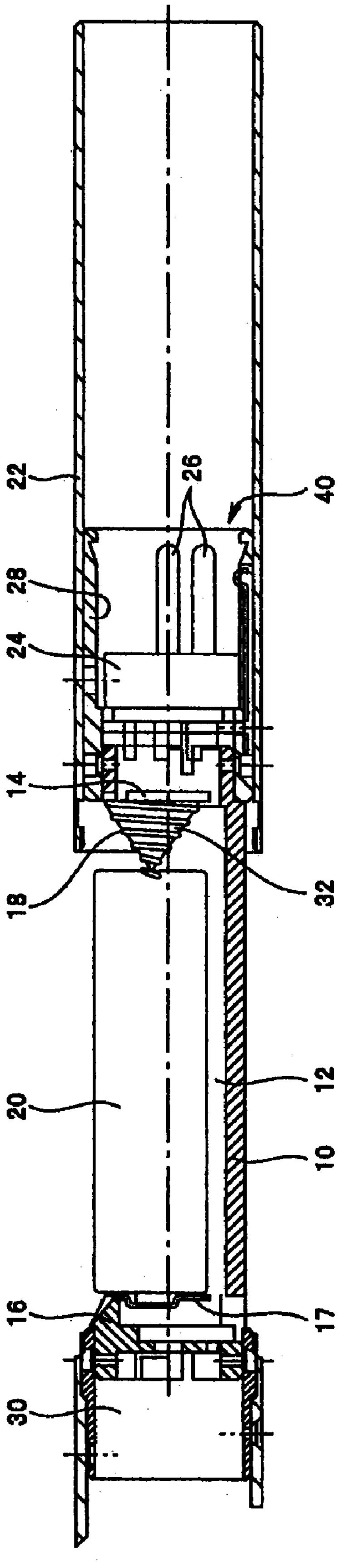
FIG. 1A is a longitudinal sectional view showing an embodiment of a condenser microphone according to the present invention, with a battery compartment being opened.

Hereinafter, an embodiment of a condenser microphone according to the present invention will be described with reference to FIG. 1A, FIG. 1B, FIG. 2A, and FIG. 2B. In addition, in the embodiment shown in FIG. 1A, FIG. 1B, FIG. 2A, and FIG. 2B, the same reference numerals are given to the same components as those of the conventional example shown in FIG. 3A and FIG. 3B.

In FIG. 1A, FIG. 1B, FIG. 2A, and FIG. 2B, a body case 10 of a microphone is an approximately cylindrical member, and a part of the peripheral wall of an intermediate portion in the axial direction of the cylinder is removed to form a partially cylindrical shape. In the body case 10, end plates 14 and 16 serving also as an electrode receptacle are fixed to both ends of the portion formed in the partially cylindrical shape, respectively, and an interior space of the partially cylindrical shape of the body case 10 partitioned by the end plates 14 and 16 serves as a battery compartment 12. The battery compartment 12 is capable of housing a battery used for a built-in power supply, e.g., one AA dry cell 20. To the end plate 16, an electrode plate 17 that is formed so as to receive a positive electrode of a dry cell 20 is mounted, and to the other end plate 14, there is mounted a coil spring electrode 18 for pressing the dry cell 20 toward the electrode plate 17, the coil spring electrode 18 being in contact with a negative electrode of the dry cell 20. The coil spring electrode 18 is a member formed by coiling an elastic conductive wire in a conical coil shape whose outer diameter decreases sequentially from the base toward the tip, wherein the base is fixed to the end plate 14. The above structure allows the coil spring electrode 18 to sink into one plane when being pushed by the negative electrode of the dry cell 20, so that a large return stroke can be obtained.

A conductive cushion 32 is disposed within the coil spring electrode 18. The conductive cushion 32 is made of conductive cloth, for example. For the conductive cloth, for example, the one made by weaving in a cloth-form a fibrous material, the fibrous material being made by applying conductive nickel plating to synthetic high polymer (e.g., trade name "nylon") material of a polyamide base, can be used. In this embodiment, "Soft shield" supplied from TAIYO WIRE CLOTH CO., LTD. is used. This conductive cloth is formed in a conical shape corresponding to the internal shape of the coil spring electrode 18, and within this coil spring electrode 18 an elastic material, e.g., urethane sponge, is disposed as the core material. In other words, the conductive cushion 32 has a structure of covering the conical-shaped core material made of urethane sponge with the conductive cloth. The coil spring electrode 18 may be always in contact with and electrically integrated with the conductive cushion 32, however, at least when the coil spring electrode 18 is being compressed the conductive cushion 32 just needs to be able to contact with the coil spring electrode 18 and be compressed together with the coil spring electrode 18.

The front end (at the left end in FIG. 1A and FIG. 1B) side of the body case 10 partitioned by the end plate 16 is a microphone unit incorporating part 30, and into this microphone unit incorporating part 30 a non-illustrated condenser microphone unit is to be incorporated. An inner periphery of one end of a connector sleeve 28 is fitted around the outer periphery of the back end side of the body case 10, resulting in the connector sleeve 28 being added to the body case 10. At the back end side of the body case 10, a microphone side output connector 40 comprised of a male connector is incorporated into the connector sleeve 28. The output connector 40 is incorporated adjacent to the coil spring electrode 18. The output connector 40 includes, behind the end plate 14 holding the coil spring electrode 18, a connector base 24 fitted into and fixed to the connector sleeve 28, and a connector pin 26 passing through this connector base 24 and being fixed thereto. The output connector 40 is the standardized three-pin type connector, so there are three connector pins 26, however, two pins are illustrated in FIG. 1A, FIG. 1B, FIG. 2A and FIG. 2B, and the rest pin is not illustrated because it is hidden behind one of the two pins. Each connector pin 26 extends in parallel with the axis of the body case 10 and connector sleeve 28. A female-type cable side connector provided at one end of a non-illustrated output cable is coupled to the output connector 40. The cable side connector is fitted into the output connector 40 along the inner peripheral face of the connector sleeve 28, and each connector pin 26 of the output connector 40 fits into each receptacle hole of the cable side connector, so that the microphone is electrically connected to an external circuit via the output cable.

Figure 1B:
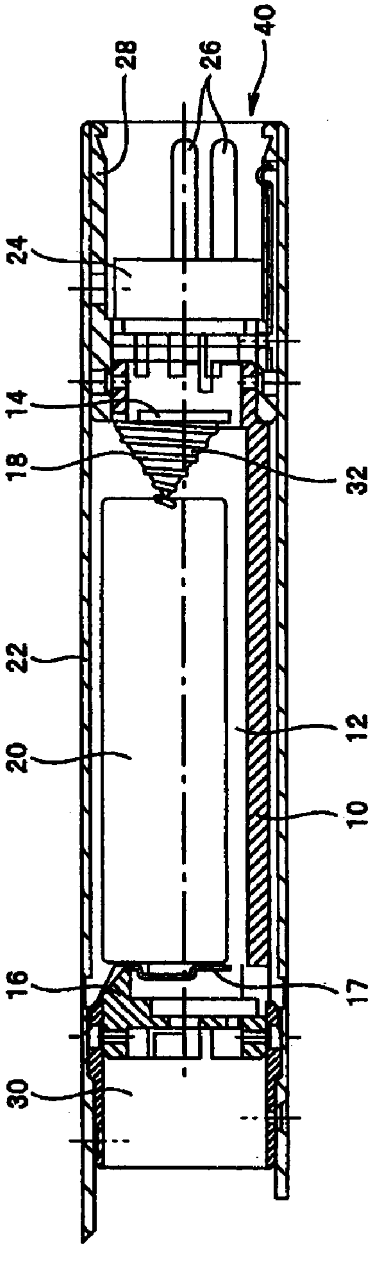
FIG. 1B is a longitudinal sectional view showing the embodiment of the condenser microphone according to the present invention, with the battery compartment being closed.
Figure 2A:
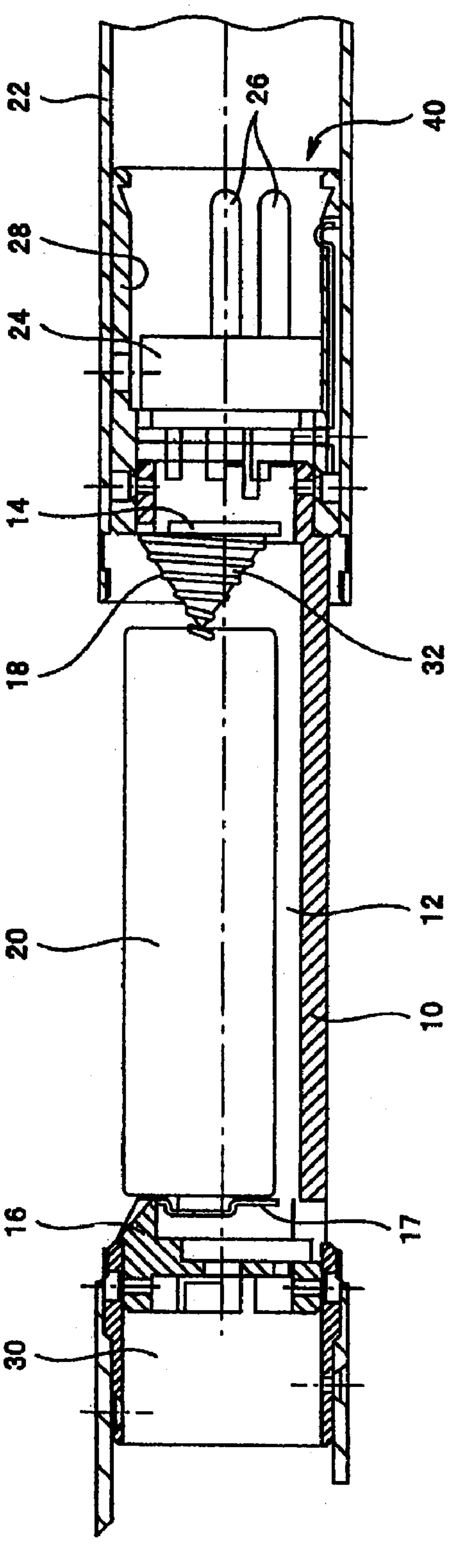
FIG. 2A is an enlarged longitudinal sectional view showing the embodiment with the battery compartment being opened.
Figure 2B:
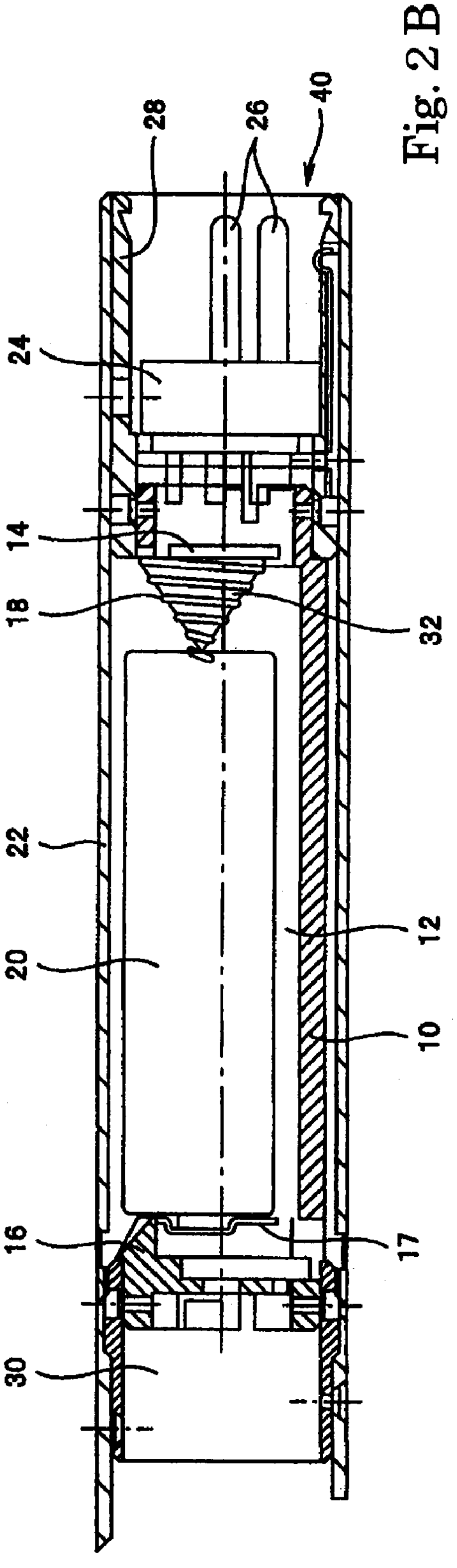
FIG. 2B is an enlarged longitudinal sectional view showing the embodiment with the battery compartment being closed.

A cylindrical cover 22 is fitted around the outer periphery of the connector sleeve 28. The cover 22 is movable in the axis direction of the body case 10 while sliding along the peripheral face of the connector sleeve 28, and as shown in FIG. 1A and FIG. 2A, the battery compartment 12 is opened by sliding the cover 22 to the back end side of the body case 10, and as shown in FIG. 1B and FIG. 2B, by sliding the cover 22 toward the front end side of the body case 10, most of the body case 10 is covered so as to close the battery compartment 12. As shown in FIG. 1A and FIG. 2A, while the battery compartment 12 is opened, the dry cell 20 can be inserted and removed. As shown in FIG. 1B and FIG. 2B, the cover 22 covering most of the body case 10 functions also as a grip of the microphone.

Figure 3A:
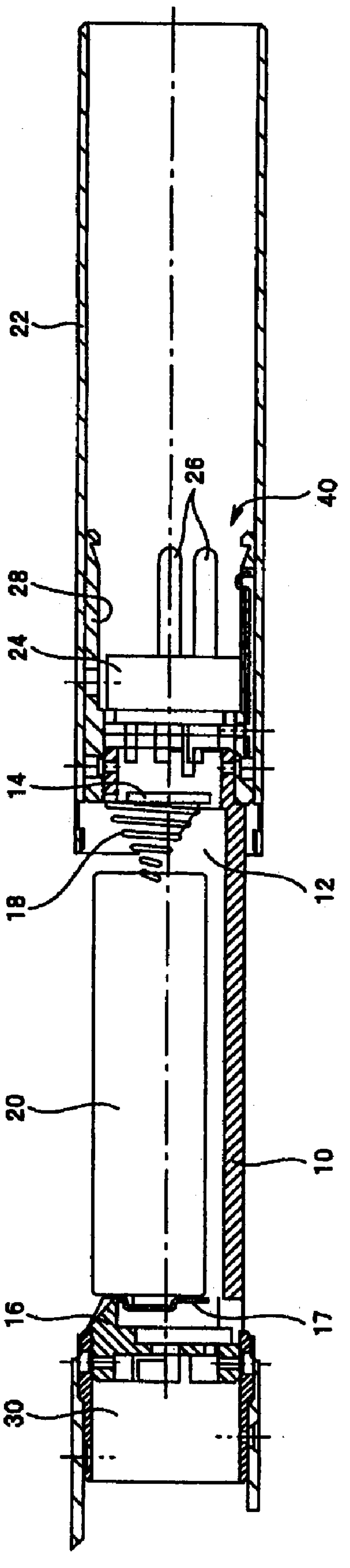
FIG. 3A is a longitudinal sectional view showing an example of a conventional condenser microphone with a battery compartment being opened.
Figure 3B:
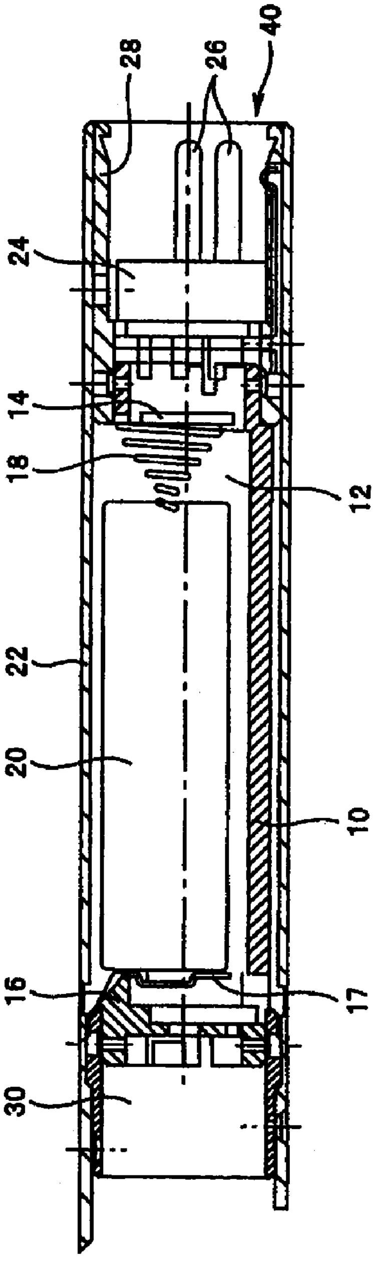
FIG. 3B is a longitudinal sectional view showing the example of the conventional condenser microphone with the battery compartment being closed.

As with the conventional example shown in FIG. 3A and FIG. 3B, the output connector 40 of the microphone exists adjacent to the battery compartment 12, and the output cable is connected to this output connector 40. The battery compartment 12 is constructed so as to be opened and closed with the cover 22 in order to insert and remove the battery, and the output connector 40 is constructed so as to connect and remove the cable side connector. For this reason, there is a gap required for opening and closing or connecting and removing in the battery compartment 12 as well as in the output connector 40. Due to the existence of this gap, high frequency current is likely to penetrate as described above. According to the conventional example shown in FIG. 3A and FIG. 3B, the coil spring electrode 18 functions as a coil with respect to the penetrating high frequency current, thus causing penetration of the high frequency current into the microphone.

However, according to the embodiment shown in FIG. 1A, FIG. 1B, FIG. 2A, and FIG. 2B, at least in a mode in which the dry cell 20 is inserted in the battery compartment 12 of the body case 10, the coil spring electrode 18 is pushed and compressed by the negative electrode of the dry cell 20, and the coil spring electrode 18 is thus in contact with the conductive cushion 32 and electrically integrated with the conductive cushion 32, so that the coil spring electrode 18 will not act as a coil with respect to the high frequency current. As a result, the high frequency current will not penetrate into the microphone through the coil spring electrode 18, and thus the occurrence of noise caused by the high frequency current can be suppressed.

Since the conductive cushion 32 can expand and contract together with the coil spring electrode 18, the return stroke of the coil spring electrode 18 will not be restricted by the conductive cushion 32.

By contacting the conductive cushion 32 with the coil spring electrode 18, a resonant vibration of the coil spring electrode 18 can be suppressed and thus the occurrence of mechanical noise due to the coil spring electrode 18 can be suppressed.

What is claimed is:

1. A condenser microphone comprising:

a body case into which a condenser microphone unit is incorporated;

a battery compartment provided in the body case;

a coil spring electrode that is provided at an end of the battery compartment, and pushed and compressed by an electrode of a battery when battery is inserted therein; and a conductive cushion disposed within the coil spring electrode, that contacts the coil spring electrode, and is compressed together with the coil spring electrode when the coil spring electrode is compressed.

2. The condenser microphone according to claim 1, wherein the conductive cushion is made of conductive cloth.

3. The condenser microphone according to claim 2, wherein the conductive cloth is formed into a conical shape corresponding to an internal shape of the coil spring electrode.

4. The condenser microphone according to claim 3, wherein an elastic material is disposed within the conductive cloth as a core material of the conductive cushion.

5. The condenser microphone according to claim 1, wherein the condenser microphone unit is incorporated at a front end side of the body case, and an output connector is incorporated at a back end side of the body case.

6. The condenser microphone according to claim 5, wherein the output connector is incorporated adjacent to the coil spring electrode.

7. The condenser microphone according to claim 4, wherein the elastic material is a urethane sponge.

8. The condenser microphone according to claim 1, wherein the conductive cushion is electrically integrated with the coil spring electrode.

* * * * *